15-431

SEARCH ROOM

BEST AVAILABLE COPY

J. RECKENDORFER.
Pencil.

No. 7,993. Reissued Dec. 11, 1877.

7,993. PENCILS. Joseph Reckendorfer, New York, N. Y. Patent No. 36,354, dated Nov. 4, 1862; Reissue No. 3,863, dated Mar. 1, 1870. Filed Nov. 1, 1877.

A pencil consisting of a continuous wooden sheath enlarged at one end beyond the size of the ordinary lead-pencil, and thence tapering toward the other end, said tapering sheath being formed with an interior groove enlarged for a portion of its length, at the enlarged end of the sheath, containing in the enlarged part of the groove a stick of erasive rubber, and in the narrow part of the groove a lead core, as set forth.

Fig. 1.

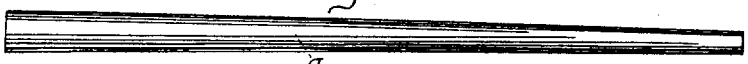

Fig. 3.

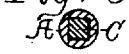

Fig. 4.

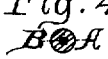

Fig. 2.

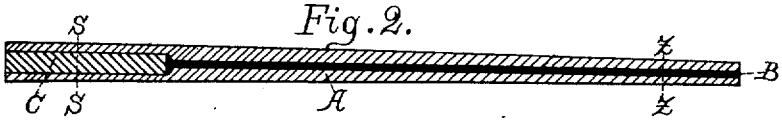

Witnesses:
M. Georgi
D. P. Cowl

Inventor:
Joseph Reckendorfer
by Maurice Bailey
his attorney

N. PETERS, PHOTO-LITHOGRAPHER, WASHINGTON, D. C.

UNITED STATES PATENT OFFICE.

JOSEPH RECKENDORFER, OF NEW YORK, N. Y.

IMPROVEMENT IN PENCILS.

Specification forming part of Letters Patent No. 36,854, dated November 4, 1862; Reissue No. 3,863, dated March 1, 1870; Reissue No. 7,993, dated December 11, 1877; application filed November 22, 1877.

*To all whom it may concern:*

Be it known that I, JOSEPH RECKENDORFER, of the city, county, and State of New York, have invented certain new and useful Improvements in Pencils, of which the following is a specification, reference being had to the accompanying drawing, in which—

Figure 1 is a side view of a pencil made in accordance with my invention. Fig. 2 is a longitudinal section; Fig. 3, a cross-section on the line S S, and Fig. 4 a cross-section on the line Z Z.

My invention relates to that kind of pencil in which a stick of erasive rubber and a lead core are contained in the same wooden case or sheath, and is intended to provide a means whereby the diameter or sectional area of the stick of erasive rubber may be increased without unduly weakening the surrounding sheath, and without, on the other hand, making the body of the pencil cumbrous or inconveniently large.

My improvement, to this end, consists in making the pencil of a continuous wooden sheath, enlarged at one end beyond the size of the ordinary pencil, and thence tapering toward the other end, said tapering sheath being formed with an interior groove enlarged for a portion of its length at the enlarged end of the sheath, containing in the enlarged portion of the groove a stick of erasive rubber, and in the narrow portion of the groove a lead core, as hereinafter set forth.

In the drawing, A is the wood casing or sheath of the pencil, made in two parts, and glued together in the ordinary manner, but made larger at one end than at the other, as represented. This sheath is grooved out with a small groove, for the reception of the lead core B for a portion of its length. The remaining part of the groove, at the larger end of the sheath, is much enlarged, and this enlarged portion of the groove is filled with a stick, C, of erasive rubber, as represented.

Pencils of equal size throughout have been heretofore made with a slip of rubber fitted in the place of the lead at one end; but such pencils have not become of any considerable practical importance in consequence of the smallness of the rubber, and it has been held impracticable to make the rubber much larger in sectional area without too much weakening the wood, or making the entire pencil thick and awkward to handle.

By my improvement on this kind of pencil the size of the rubber may be so increased as to render it a very effective eraser without unduly weakening the surrounding part of the sheath, while, on the other hand, the body of the pencil, which contains the lead core, is not cumbrous or clumsy, but can be as readily and conveniently held between the fingers and handled as can an ordinary lead-pencil.

In preparing the wood portions of my pencil I prefer to saw the material into tapering slips, lying alternately with ends in opposite directions, and afterward reduce these pieces to the required form, thus economizing material as far as possible.

I make the exterior of my improved pencil of a round, square, hexagonal, octagonal, oval, or other section, as may be desired, and finish it in any style, but always make the head of a larger diameter than the opposite end.

The lead and rubber may also be of any desired section, and may also be tapered, if preferred; but the rubber should always be the larger, and I prefer the uniform section of each, as represented.

Any other erasive material may be substituted for the rubber C without affecting the character of my invention, or a crayon or lead of a different color or quality may be substituted therefor, if desired. Crayons and the softer qualities of lead require a larger section than that given to the part B, and the enlarged head of the pencil will receive them equally as well as the rubber.

In conclusion, I state that I do not claim, broadly, a pencil containing in the same wooden case or sheath a lead core in a narrow interior groove and a rubber eraser in a larger interior groove; but

What I claim, and desire to secure by Letters Patent, as an improvement on this kind of pencil, is—

A pencil consisting of a continuous wooden sheath enlarged at one end beyond the size of the ordinary lead-pencil, and thence tapering toward the other end, said tapering sheath being formed with an interior groove enlarged for a portion of its length, at the enlarged end of the sheath, containing in the enlarged part of the groove a stick of erasive rubber, and in the narrow part of the groove a lead core, as set forth.

In testimony whereof I have hereunto signed my name in the presence of two subscribing witnesses.

JOSEPH RECKENDORFER.

Witnesses:
A. J. BRAISTED,
WILLIAM V. A. POE.